United States Patent [19]

Lenhart

[11] 4,347,022

[45] Aug. 31, 1982

[54] AIR TABLE SYSTEM

[75] Inventor: Ronald A. Lenhart, Lakewood, Colo.

[73] Assignee: Precision Metal Fabricators, Inc., Arvada, Colo.

[21] Appl. No.: 138,006

[22] Filed: Apr. 7, 1980

Related U.S. Application Data

[63] Continuation-in-part of Ser. No. 947,441, Oct. 2, 1978.

[51] Int. Cl.³ .............................................. B65G 51/02
[52] U.S. Cl. ..................................................... 406/88
[58] Field of Search .................. 406/88, 86; 193/31 R

[56] References Cited

U.S. PATENT DOCUMENTS

| | | | |
|---|---|---|---|
| 2,472,563 | 6/1949 | Bourland | 193/31 R |
| 3,185,277 | 5/1965 | Agnew | 193/31 R |
| 3,684,327 | 8/1972 | Hurd | 406/86 |
| 3,999,806 | 12/1976 | Hurd | 406/88 X |
| 4,010,981 | 3/1977 | Hodge | 406/88 |

*Primary Examiner*—Joseph E. Valenza
*Assistant Examiner*—Gene A. Church
*Attorney, Agent, or Firm*—Max L. Wymore

[57] ABSTRACT

An air table system which utilizes air jet openings in the table surface of a pattern configuration to lift, support and direct movement of containers to feed same from a plurality of sources to fewer destinations or vice versa. With suitable cover configuration, partially closed and open covers, movement of the containers around or to one side of blockades to accomplish controlled movement of the containers is made possible.

8 Claims, 10 Drawing Figures

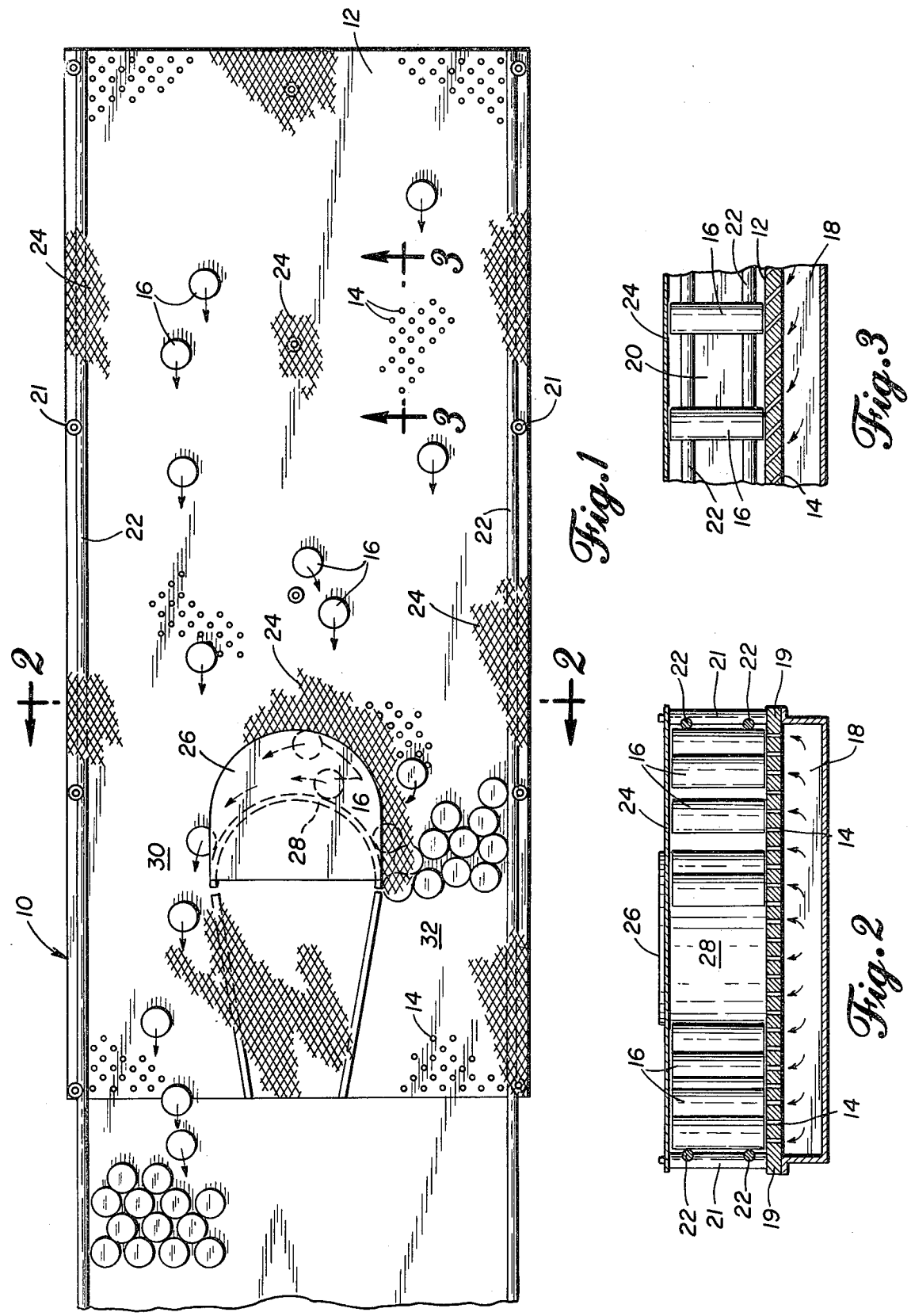

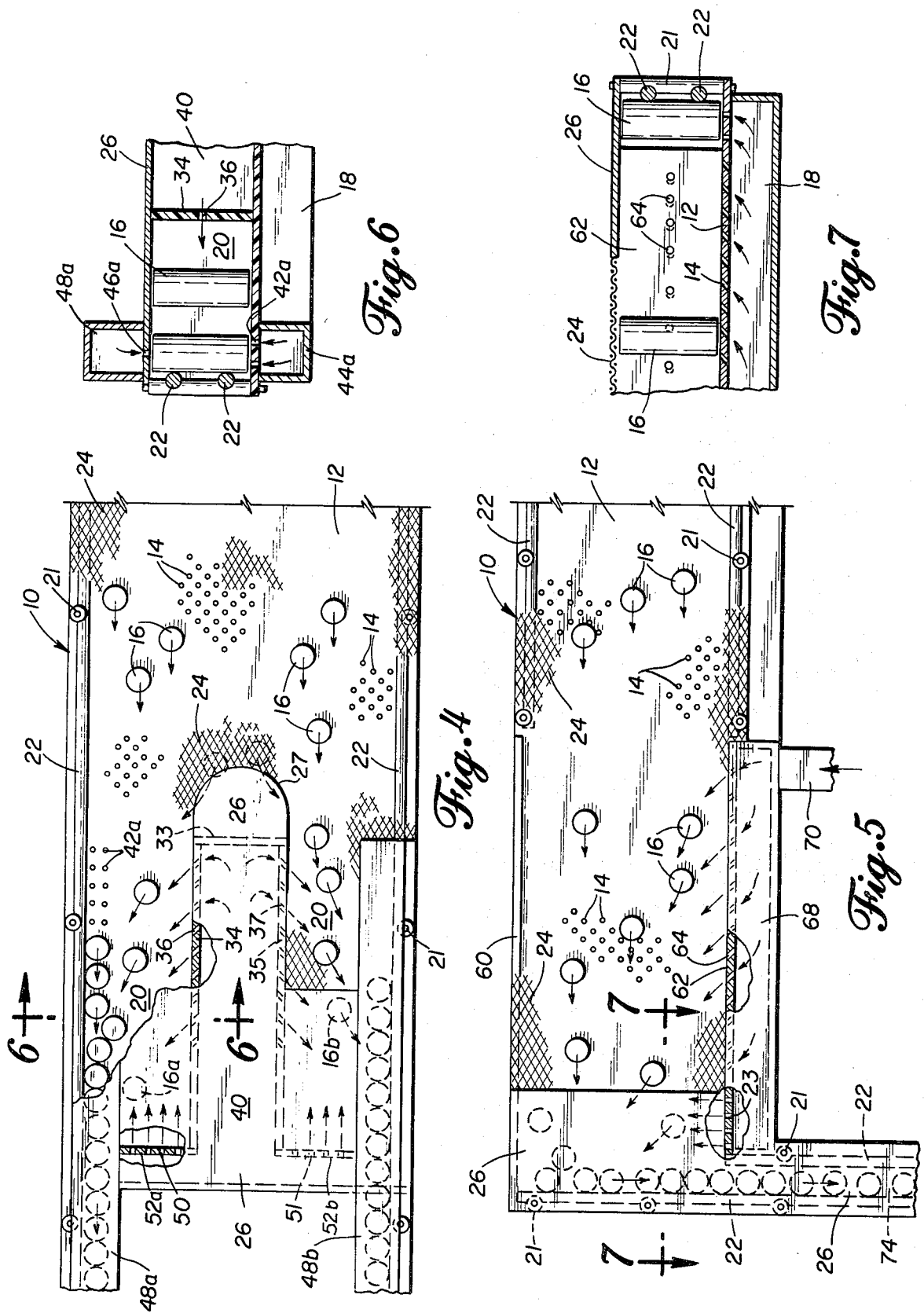

AIR TABLE SYSTEM

This application is a continuation-in-part of my U.S. application Ser. No. 947,441 for "AIR TRANSPORT SYSTEM" filed Oct. 2, 1978.

This invention relates to an air table system useful in transporting and moving containers and the like over long distances en masse, accepting containers from one or a plurality of sources and discharging them as a single stream or a plurality of streams.

There are many occasions in the mass production of containers of similar size such as glass, plastic or metal containers and the like where a plurality of feed lines from several sources need to be merged into a single multiple line or that a single multiple line needs to be separated into one or more single lines. This is desirable, for example, for directing containers to testing stations, labelling, filing or other stations in a packaging operation and/or manufacturing operation.

There are devices that are presently known which may be used to separate a single line into several lines. One known type of such apparatus which is located between a single line conveyor and a triple line conveyor is disclosed in Bourland U.S. Pat. No. 2,472,563. That apparatus includes a dead plate having two vibrating or eccentric pins dividing the downstream end of the plate into three gates or outlets. The upstream single line conveyor feeds a continuous line of tin cans toward the center gate defined by the vibrating pins. The downstream conveyor is run at approximately one-third the rate of the upstream conveyor, such that cans tend to collect on the dead plate. When cans back up along the centerline, additional cans moving onto the dead plate are deflected sideways by vibratory movement of the pins. The eccentric rotation of the pins provides the vibratory action which distributes the containers into two lines on either side of the centerline defined between the pins.

Another apparatus for spreading containers from a single line into three lines is found in Giulie U.S. Pat. No. 3,433,343. This patent discloses a specially configured transfer plate that includes a left hand apron and a right-hand apron and a raised central portion. The central portion is arcuately shaped along its side edges so as to guide a can into either of two side lines. A rejection device having a reciprocable finger is located on each side at the end of the single line conveyor. The rejection devices alternately push the cans to one side or the other of the raised central section depending on which rejection device is energized. When neither rejection device is energized, the can simply passes onto the raised central section.

Another type of such apparatus is shown in Agnew U.S. Pat. No. 3,185,277. The cans are transferred from a single upstream chute to either of two downstream chutes by means of a y-shaped divider. Alternate cans in the incoming line, instead of being mechanically pushed into one of the two downstream chutes are blown into the desired downstream chute by selectively actuated air nozzles.

Still another type of apparatus is found in the Brady U.S. Pat. No. 3,685,632. This patent discloses a pneumatic spreader which arranges a series of similar articles such as glass containers moving in single line arrangement into two or more ongoing lines. The spreader includes an air table having a multiplicity of air outlet ports in it and side guide rails that define a transfer area on the air table. The air ports are positioned in at least a left-hand apron and a right-hand apron, the outlets in the respective aprons being directed generally downstream but angularly away from those of the other apron. As articles pass over the air table they float on a continuous air cushion and are distributed by angulated air jets issuing from the ports into the plural ongoing lines. A plate-like cover is positioned over the transfer area closely above the tops of the articles so as to prevent them from tipping or falling over as they are transferred from and to the conveyor and move on an air cushion. Pegs are used to block flow of articles past them and assist in the formation of defined container lines.

These prior art spreader devices all provide minimal control in the transfer of containers due to lack of control over contact and the use of mechanical contact to guide the containers. Where air is used it is used with such force that the air blast would create undesirable movement of the containers both in direction and speed to cause damage to the containers.

It is therefore an objective of the present invention to provide an improved air table arrangement where only air jets and gravity act upon the containers for transport and movement thereof with minimal mechanical contact or guidance.

Another object of the present invention is to provide a new and novel air table jet arrangement which will provide the necessary stability of empty containers being handled thereby.

A further object of the present invention is to provide an improved air table arrangement which provides for positive splitting of a mass of containers into two or more columns even to a single file.

A still further object of the present invention is to provide an improved air table arrangement having a configuration of air jet openings having not less than three such openings across the dimension of the containers transported thereon every 90 degrees of rotation.

Still another object of the present invention is to provide an improved air table arrangement wherein the air jet openings in the surface thereof are positioned at an angle off normal to the surface of from 3° to 45° and preferably from 5° to 40° in a downstream direction.

A still further object of the present invention is to provide an improved air table arrangement wherein the air jet openings are in a configuration to provide not less than 4 jets engaging each container conveyed thereon.

Another further object of the present invention is to provide an improved air table arrangement having a configuration of air jet openings to provide not less than nine such openings engaging each container at least one position of the container conveyed thereon.

Other objectives and advantages of this invention will be more apparent from the following description taken in conjunction with the accompanying drawings in which:

FIG. 1 is a top plan view of one embodiment of the present invention used as a splitter arrangement;

FIG. 2 is a view along line 2—2 of FIG. 1;

FIG. 3 is a view along line 3—3 of FIG. 1;

FIG. 4 is a top plan view of still another embodiment of the invention;

FIG. 5 is a top plan view of a further embodiment of the invention;

FIG. 6 is a view along line 6—6 of FIG. 4;

FIG. 7 is a view along line 7—7 of FIG. 5;

Figure 9:
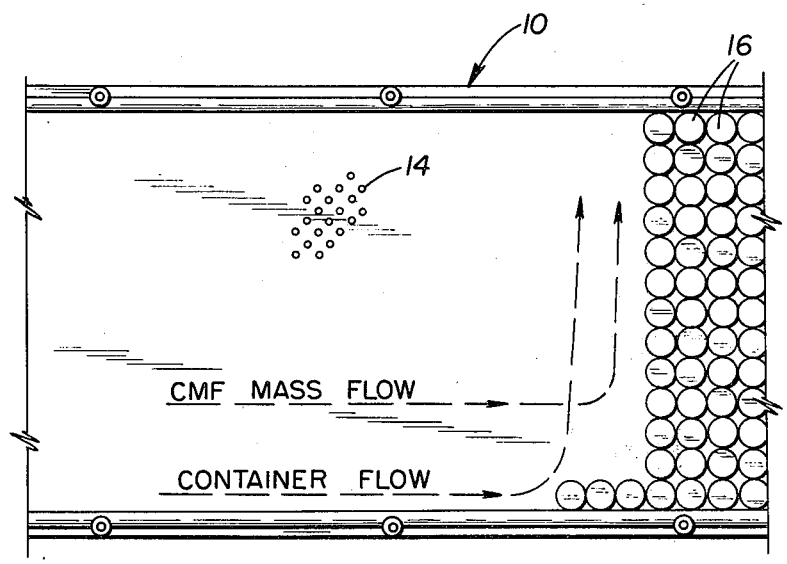
Figure 10:
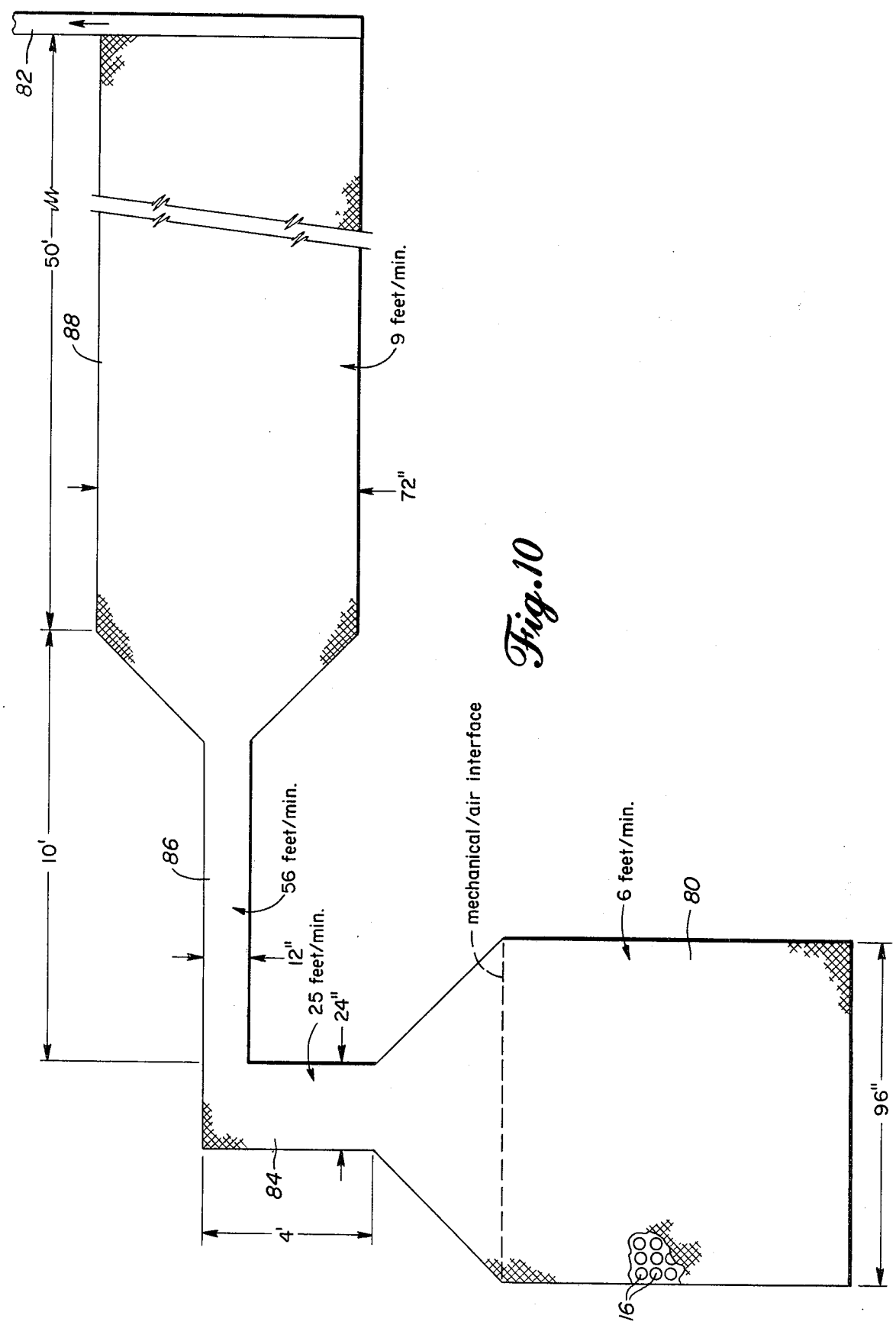

FIG. 9 is a top plan view of the surface of the air table showing the effect of CFM in the control of containers; and, FIG. 10 is a diagrammatic representation of an air table according to this invention showing the use and determination of the air jet angles which will give the desired transport control of containers in an air conveyor system transporting containers from one station to another to provide storage of containers in the event of a stoppage for whatever reason.

Figure 8:
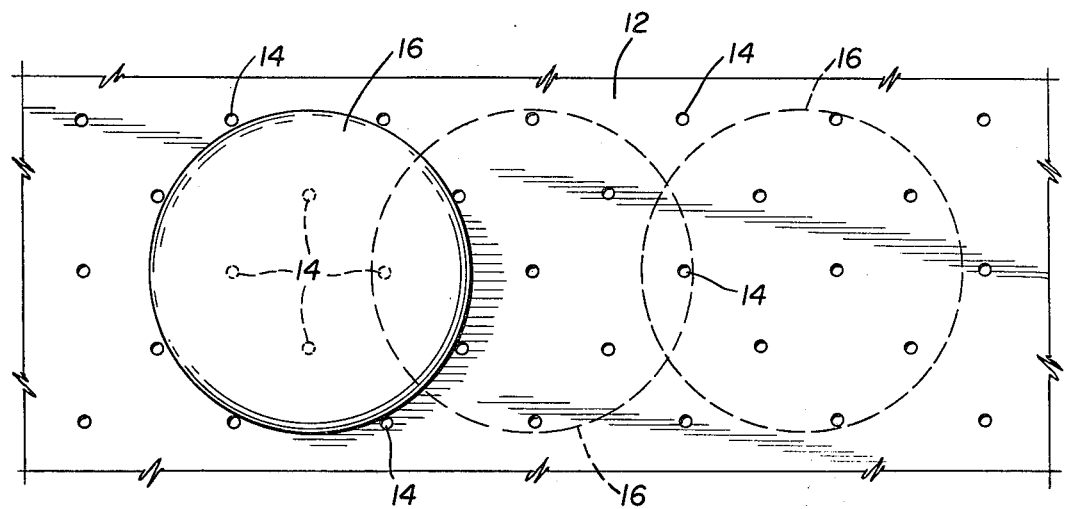
FIG. 8 is a top plan view of the surface of the air table to an enlarged scale showing a preferred arrangement of air jet openings.

In the embodiment shown in FIG. 1 there is provided an air table 10 having a surface 12 perforated by a multitude of openings 14 therein through which air passes from an air supply duct or plenum 18, FIGS. 2 and 3, to support containers 16 on a cushion of air within the container area 20, FIG. 3. A pair of guide rails 22, FIGS. 2 and 3, of suitable material are positioned along the edges 19, FIG. 2, of the table and supported by posts 21. A cover 24 may be provided over the air table usually of perforated or open mesh configuration. The cover 24 is positioned relative to the air table surface to receive the containers 16 and permit movement of the containers therebetween. The air jet openings 14 are positioned at an angle with respect to a line perpendicular to the surface 12 to provide a force vector with forces acting both vertical and parallel to the surface 12. The angle of the jet openings is found to be in the range of from about 10° to 50° from the vertical to the surface and preferably from about 15° to 45°. The jet opening size and the static pressure of the air in the plenum 18 are chosen to provide the energy necessary to lift and float the container and to also provide sufficient force acting parallel to the containers to move same as desired. The pattern of the jet openings 14 is preferably of a staggered configuration with every other row of openings being offset as shown in FIG. 8. The size of the jets is selected with respect to the static pressure of the air supplied thereto to provide a vertical force sufficient to lift and support a container to be transported. The jet angles are selected to provide the parallel force component required to move the containers at the desired speed. The jet velocity is selected by varying the jet opening size and/or the static pressure present in the supply duct. The jet velocity and volume (CFM) will vary with the size of the jet at the same static pressure. The smaller the jet opening, the lower the jet velocity and volume (CFM) at the same static pressure. The pattern of the jet openings is preferably symmetrical wherein the openings are located at the apexes of successive rows of serially positioned alternately reversed isosceles triangles. One configuration of air jet openings of an operative embodiment of the air table according to this invention, handling 12 ounce aluminum beverage cans with an effective cross sectional area having a base diameter of $2\frac{1}{8}$ inches, was found to be with jet openings of 3/32" diameter located in rows of one inch on centers with the rows being spaced one-half inch apart and the centers of alternate rows being off-set by one-half inch.

Referring again to FIG. 1, portions of the cover 24 may be solid as at 26. In a splitter configuration, as shown, a curved wall or stop 28 may be vertically positioned where it is desired to divide a bulk mass of containers into two or more columns. The air issuing from jets under the perforated cover 24 is allowed to escape therethrough, however, wherever there is a solid cover 26, if the containers are interrupted in their progress over the air table as by vertical wall 28, pressure will build up between the containers causing the containers to separate. FIG. 1 shows two paths or areas 30 and 32 separated by the semi-cylindrical vertical wall 28 positioned beneath solid cover portion 26. When the bulk of containers 16 reaches the vertical wall 28, the solid cover 26 causes a build up of air pressure between those cans 16 thereunder. In the absence of restraint, the cans will separate and divide into two columns and pass to either side of wall 28. If an impediment occurs in the container flow on one of the two sides, such as the stoppage or delay downstream as at 32, the containers will move to the opposite side of the table where they will continue to feed into 30. The feeding continue without pressure being exerted on the delayed column 32. Here again, the present invention makes use of the generation and maintenance of a pressure zone between containers greater than ambient pressure to separate and maintain the containers part during the handling operation as in applicant's earlier application.

The exhaust volume (CFM) of air issuing from the air table also plays an important part in the control and handling of containers thereby. Guide rails 22 are combined with the containers to control the escape of air from the sides of the table. The guide rails 22 are shown as being open to permit air to readily escape, however, the guides may be semi-closed or completely closed if desired to control the mass flow of air to assist in the control of the flow of containers. As exemplified in FIG. 9 where there is shown an elongate air table 10, partly broken away to conserve space, a mass of containers 16 have collected at the right-hand portion thereof. The containers 16 have been introduced in a single file along the lower portion of the table; however, the mass air flow or volume of air (CFM), over the surface of the table plus the closure of the side by the incoming containers, will cause the containers to drift across the table toward the upper portion and more or less uniformly distribute the containers across the width of the air table. Thus, the volume of air (CFM) provides a means for the air table to be self-balancing or self-regulating such as to maintain the table balanced even when the flow of containers from the table surface is halted. As seen in FIG. 9, the air volume (CFM) will cause the containers to move either parallel or perpendicular to the angle of the air jets 14 as where the containers move across the air table. The containers on the side located at the bottom of the figure form a barrier against escape of air along the side and directs the air flow across the table towards the side near the top of the figure. This will cause the containers to follow a similar path to fill any void in the rear of the mass of containers. Also the mass of containers may be made to follow predetermined paths by providing solid sides at desired locations. The mass of air (CFM) issuing from the air jets is utilized to move or herd the containers en masse. The speed of individual containers is regulated by the volume of air (CFM) issuing from jet openings ahead or downstream of the containers and the angle of the jet openings is selected in accordance with the speed of transport of the containers desired.

The use of a perforated or open cover 24 as in FIG. 1 with portions thereof being solid allows escape of air through the cover except for the solid portions. Here the escape is only to the side or through the perforated cover beyond the solid portion. The containers entering under a solid portion will pass directly through the area under the solid cover in the direction of travel; however, if the air table is full and in a static condition, not all of the air beneath the solid portions of the cover will be able to escape except from between the containers which will cause considerable separation of the containers due to the higher than ambient pressure zone produced therebetween.

As seen in FIG. 1, there is the combined effect of a solid cover 26 with a cylindrical vertical wall 28. When positioned within the area of the mass conveying zone 20, FIG. 3, of the air table the articles being conveyed will be divided into two or more distinct conveying zones or columns 30 and 32 that can be guided either parallel or perpendicular to container mass flow for separation and delivery left and right as desired. Each conveying zone is defined on either side by guide rails 22. Should one or more of the conveying zones become imoperable, the splitter 26 and wall 28 would direct the full flow of the mass of containers being conveyed into the operable conveying zone or zones. Should all of the conveying zones be operable but at different speeds or on an intermediate demand basis, the splitter 26 will automatically monitor each respective conveying zone and supply the required number of containers to meet the demand in each conveying zone. This is all accomplished automatically without special controls.

Referring to FIG. 4, there is shown another embodiment of the present invention with the air table 10 provided with a surface 12 having air jet openings 14 therein inclined at an angle of from 3° to 45°, preferably from about 5° to 40°, from the vertical and slanted in a downstream direction, which in FIG. 4 is from the right to the left of the drawing. The jet openings are sized and patterned with respect to the effective or base diameter of the containers such that from at least four or more to about nine jet openings are under each container 16 during the transport thereof, FIG. 8. The air table 10 is provided with an open mesh cover 24 for the air to escape after issuing from jets 14. A solid cover portion 26 is positioned at the downstream end of the air table and has a centrally located finger 27 with a rounded end projecting upstream. A plenum 40 is formed under the finger 27 by means of side walls 34 and 35 having therein downstream directed jets 36 and 37 respectively and having a solid end 33. As best seen in FIG. 6, a double row of jet openings 42a and 42b (not shown) are provided in the surface of the air table along each side coextensive with side walls 34 and 35 (not shown) with a plenum 44a and 44b (not shown) providing a connection of the jets to a source of air under pressure. In like manner, a single row of air jet openings 46a and 46b (not shown) are provided in the otherwise solid cover 26 along the downstream sides with a plenum 48a and 48b providing a connection thereof to a source of air under pressure. As indicated, a similar arrangement is provided on the other side of the air table. A pair of guide rails 22 are positioned along each side of the air table and supported by posts 21. To either side of the base of the finger 27 a plurality of blowback jets 50 and 51 are provided, respectively, in walls 52a and 52b which are positioned transverse of the air table. Jets 50 and 51 may be supplied by the same source of air connected to plenum 40 or by a separate source as desired. A solid transverse wall 54 cooperates with walls 52a and 52b to provide an air conduit to supply air to jets 50 and 51 as well as jets 36 and 37.

In operation the containers 16 enter the air table from the right and are lifted and moved to the left by air issuing from the jets 14. When the containers in the center of the mass progress under the solid cover of the finger 27, the air which would normally escape from between the containers through the mesh cover 24 is trapped between the containers creating a pressure zone therebetween. The containers are caused to separate and be directed either right or left of the finger 27. It will be appreciated that the pressure in the space between the surface of the table and the cover will vary in passing from underneath the perforated or open cover to being underneath the solid cover and that the pressure will vary in accordance with the size of the openings in the top as well. The containers will then be picked up by the jets of air from jet openings 37 or 36 in walls 35 and 34, respectively, and moved against the guide rails 22 on each side as at 16a and 16b. The air jets issuing from jets 42a and 46a on the other side move the cans into a single file and the air issuing from air jets 50 and 51 assist in moving the containers 16a and 16b into contact with guide rails 22.

Referring now to FIG. 5, there is shown another embodiment of the air table 10 of the present invention providing a single file feed at right angles to the general container flow. The air table is provided with a surface 12 having a plurality of jet openings 14 therein inclined at an angle of from 3° to 45°, preferably from about 5° to 40° from the vertical and slanted in a downstream direction. The jet openings are sized and patterned with respect to the effective or base diameter of the containers such that from at least four or more to about nine jet openings are under each container 16 during the transportation thereof. Air is supplied to the jet openings by means of plenum 18, FIG. 7, connected to a suitable source of air under pressure. Guide rails 22 are provided on each side of the air table and are supported by posts 21. The sides having guide rails 22 are open along the top and bottom of FIG. 5 and solid side walls 60 and 62 are provided along the sides adjoining and to the left of the open sides formed by the guide rails 22. The side wall 62 is provided with a series of air jet openings 64 therein slanted in a downstream direction. The air jet openings to the very left as at 23 may be at a different angle to facilitate container handling. The left or discharge end of the air table is provided with a pair of guide rails 22 supported by spaced posts 21 defining an open wall. The air jet openings 64 in side 62 are connected to a source of air under pressure via plenum 68 and conduit 70. Another pair of guide rails 22 are supported by spaced posts 21 to define an open wall and are positioned in spaced parallel relation to the other guide rails at the end of the air table to cooperate therewith to provide a single container channel 74 therebetween. The air table 10 is provided with a perforated cover 24 except for the discharge end which is provided with a solid cover 26 that extends to cover channel 74 as well.

In operation, the embodiment of FIG. 5 moves containers to the left in the drawing where air from jets 64 push the containers towards the top of the figure and the containers pass beneath the solid cover 26 which serves as a buffer storage while containers are urged into any opening found in the line of containers to form a single file for discharge towards the bottom of the figure through channel 74.

Referring now to FIG. 8 there is shown a portion of the surface 12 of the air table 10 to an enlarged scale showing one pattern of the air jet openings in relation to the containers 16 to be conveyed or otherwise handled thereby. It has been found that for satisfactory operation and stability in the transport and handling of containers that a minimum of at least four (4) jets 14 are required to impinge on the effective bottom or base of the container at any one time. As shown, the pattern of jet openings in a preferred embodiment is on one inch centers with alternate rows being one-half inch apart and centers offset by one-half inch. By way of illustration and not limitation, the sizes of the jet openings tested were 3/32" diameter, 7/64" diameter and 1/8" diameter and air jets were working against a 12 ounce aluminum can weighing 14.1 grams, having an effective bottom or base diameter of 2 1/8". A minimum pressure of 0.3 of an inch static pressure was required to lift a container producing jet velocities of 1200 feet per minute, 1450 feet per minute and 1550 feet per minute, respectively at 0.3 inch static pressure. At 0.4 inch static pressure, the jet velocities were found to be 1450, 1700 and 1800 FPM, respectively, and at 0.5 inch static pressure the jet velocities were found to be 1500, 1900 and 2100 FPM, respectively. In those situations where the volume flow or cubic feet per minute of air issuing from the jet openings is of importance such as where the CFM is acting upon a mass flow to assist movement thereof, a larger diameter jet will provide an increased CFM for the same velocity. For example, with 3/32 inch jet openings with a velocity of 1500 FPM velocity, the CFM is about 0.072. Where the jet openings are 1/8" diameter, the CFM is about 0.128 at a jet velocity of 1500 FPM. Where an increase in velocity is desired with a minimum increase in air volume, CFM, the velocity of the air from the jets can be increased by an increase in the static pressure.

While the embodiments illustrated show the use of a perforated or open mesh cover 24 to assist in the stabilization of the containers and prevent their tipping over, where the velocity of the individual containers is relatively low and is near that of the mass of containers being transported, the cover 24 of the air table may be completely omitted and the use of any cover may be avoided. It is only where the velocity of individual containers is greater than the velocity of the mass of containers that a cover is necessary or useful. Of course, container tipping is of greatest concern where the height of a container is several times the greatest base dimension. Where the height is less than several times the base dimension, there is less tendency for the container to tip and a cover for the air table is unnecessary.

With the air table jet opening pattern of FIG. 8 it is seen that there is always a minimum of four (4) jet openings 14 underlying and acting on the effective bottom or base of a container at any one time and upon movement of the container in any direction an increase in the number of air jets acting upon the container is provided. In the minimum configuration of jet openings up to at least nine (9) jet openings may be acting on a single container at any one time. Thus, it is an important aspect of the present invention to provide an air table surface with air jet openings therein in a pattern and dimensioned with respect to the container to be acted upon such that there are always at least four (4) jet openings acting upon the container with an increasing number of jet openings of at least nine (9) or more jet openings acting upon the container as the container moves with respect to the table surface. It will be appreciated that while a minimum of at least four (4) jet openings must be acting on a container to provide stable transport of the container, an increased number of jets will provide even greater stability. A container pattern going from a minimum of four (4) air jets acting on a container to a pattern of nine (9) air jets and returning to a pattern again of four (4) air jets acting on the container is found to be a preferred jet opening pattern for satisfactory operation. A greater number of jets will be even better. This pattern will repeat itself a number of times in the transporting of a container across the surface of the air table. It will be recognized that the use of many small air jets operating on a very low static pressure is to be preferred as small, closely spaced jets provide a more uniform flotation of containers with a minimum of CFM usage.

Referring more to FIG. 10, there is represented a diagram of a conveyor system using the air table of the present invention to transport containers from one station 80 to another station 82 via an air table conveyor made up of intermediate sections of air table 84 and 86. For example, station 80 might be a mechanical device, such as a washer having a width of 96 inches through which containers 16 travel at a linear velocity of about 6 feet per minute. The containers exit station 80 in a straight line to air table section 84, which is 24 inches wide and 4 feet in length wherein the containers are to travel at a linear velocity of about 25 feet per minute and exit at right angles to air table section 86, which is 12 inches wide and 10 feet in length. The movement of containers from section 84 to section 86 may be by a construction like that shown in FIGS. 5 and 7. The containers 16 are to travel in section 86 at a linear velocity of about 56 feet per minute. The containers then exit into section 88 which is 72 inches wide and 50 feet long. The containers travel in section 88 at about 9 feet per minute and exit to station 82 which may be a single filer like that disclosed and claimed in applicant's Pat. No. 4,182,586 issued Jan. 8, 1980. The angle of the air jets is important since the horizontal force vector thereof determines the velocity the containers are transferred. In the example of FIG. 10 the section 88 is useful to provide a storage of the containers where a stoppage of flow of containers received by station 82 occurs.

The air jets in the surface table 10 as used in sections 80, 84, 86 and 88 are selectively chosen as to size and angle to provide desired transport of containers while operating at roughly the same static pressure of air supplied thereto. The vertical force vector of air from the air jets is determined by the static pressure of the air in conjunction with the velocity of the air required to lift a container. Consider the transport of a 12 ounce steel can weighing 34.2 grams with the transport of a 12 ounce aluminum can weighing 14.1 grams. Because the steel can is heavier a greater jet velocity is required to lift the can. If the same jet size is used a higher static pressure in the plenum would produce a greater jet velocity; however, this would also result in a greater volume of air (CFM). As the steel can and the aluminum can are the sme size they will require the same amount of CFM. To provide the jet velocity necessary to lift and float the heavier steel can, a reduction of the jet diameter is required to maintain the same CFM at a higher static pressure in the supply duct.

A minimum CFM is required per square inch of the effective bottom of a can. When this figure is divided by the number of jets acting on the bottom, this indicates the CFM of air required from each jet. Based on the jet velocity required, the size of the jet openings can be determined to provide the necessary CFM with a given static pressure.

The static pressure is selected and maintained constant in conjunction with the predetermined jet size to lift a predetermined weight. This is accomplished by the vertical force vector of the jets. The horizontal force vector is selected according to the transport velocity and the angle of the air jets is selected to provide with the predetermined jet diameter and static pressure, the desired horizontal transport velocity of the cans.

The following are the steps to arrive at a proper design:

1. The weight of an object to be transported is determined.
2. Establish the jet velocity necessary to lift the object.
3. Determine the volume of air (CFM) required to float the object acted upon, the velocity of the air jet and the volume of air (CFM).
4. Determine the desired flow rate of the objects (FPM).
5. Determine the angle of the air jets required to produce the horizontal force vector to move the objects at a predetermined flow rate.

Referring again to FIG. 10, 12 ounce aluminum cans 16 are coming off a washer or the like at about 6 feet/minute and flow onto section 84 selected to run at 25 feet/minute. Section 84 is provided with jet openings of 3/32 inches in diameter and air at a static pressure of 0.5 is supplied thereto. It is determined that a horizontal force vector of 208 feet/minute is required and that with the particular jet size and static pressure (will be substantially constant over the entire system), the jet angle to provide the desired flow rate of 25 feet/minute is 10 degrees.

In like manner, the flow rate in section 86 is selected to be 56 feet/minute under the same conditions. Here it is determined that a horizontal force vector of 467 feet/minute is necessary to provide the desired flow rate. Here it is determined that with the same static pressure the jet angle to provide the desired flow rate of 56 feet/minute is 18 degrees.

Similarly, the flow rate in section 88 is selected to be 9 feet/minute under the same conditions. Here it is determined that a horizontal force vector of 75 feet/minute is necessary to provide the desired object flow rate and the jet angle to provide the desired flow rate is 3 degrees. Thus, it is seen that when the rate of transport is selected to achieve the selected transport rate. Also, the transport rate may be selected to be different in different sections or even within the same section. For example, in section 88 of FIG. 10, it may be desirable to have a higher rate of transfer at the beginning or left-hand end such as perhaps 20 feet/minute. Thus, this portion of section 88 may be provided with air jets at an angle to provide this rate. By means of selecting the jet angles it is possible to design a system which will meet specific requirements in the transport of objects. If the single filer 82 were to shut down, the containers would accumulate in section 88 until the stoppage is cleared. On the other hand, if the washer is stopped, the containers will continue to feed through the transport system to the single filer.

While there have been described what at present are considered to be the preferred embodiments of this invention, it will be obvious to those skilled in the art that various changes and modifications may be made therein without departing from the invention. It is aimed therefore, in the appended claims to cover all such changes and modifications which fall within the true spirit and scope of the invention.

What is claimed is:

1. An air table apparatus for the transport of objects which comprises:
   a table having a surface, edges and an underside with a prearranged pattern of air jet openings in the surface slanted in a downstream direction and communicating the surface and the underside;
   a plenum adapted to be connected to a source of air under pressure underlying and attached to the underside of the table surface;
   a perforated cover spaced and supported above the table surface a distance slightly greater than the height of an object being worked upon including solid cover portions; and,
   a vertical barrier means positioned between the table surface and the cover such that objects moving under the solid cover, separate and pass to either side of the barrier means.

2. The air table of claim 1 wherein the air jet openings are slanted at from about 3° to about 45° from a normal to the upper surface of the table and preferably from about 5° to about 40° thereto and wherein the angle of the jet openings is selected in conjunction with the size of the jet openings and the static pressure of the air supplied to the jet openings to lift and support the objects and to provide a mass air flow over the air table sufficient to control and regulate the transport velocity of the mass flow of objects.

3. The air table of claim 1 wherein the air jet openings are positioned in a symmetrical pattern wherein the openings are located at the apexes of successive rows of serially positioned alternately reversed isosceles triangles and wherein the size of the jet openings is selected with respect to the static pressure of air supplied to the jet openings to provide a vertical force sufficient to lift an object.

4. The air table of claim 3 wherein the dimension of the jet opening pattern is selected with respect to the dimensions of the surface of the objects presented to the air table such that not less than four jets address the objects surface at any one time.

5. The air table of claim 4 which includes an air jet opening pattern dimensioned such that the cross sectional area of each object opposing the air jet openings in the table surface opposes in the range of from four to nine jet openings in moving a distance equal to one-half the length of the base dimension of the isosceles triangle pattern of the air jet openings.

6. The air table of claim 2 wherein the angle of the air jets is selected to provide a horizontal force vector of a magnitude to transport objects at a predetermined rate.

7. The air table of claim 6 wherein the table surface is divided into a plurality of sections and the angles of the air jets therein are selected to provide horizontal force vectors of a magnitude sufficient to transport objects on each section at a selected predetermined rate.

8. The air table of claim 1 including guide rails positioned along the edges of the table surface coextensive therewith to assist in guiding objects being transported, wherein the static pressure of air supplied to the jet openings is selected with respect to the size of the jet openings such that the velocity of the air issuing from the jet openings is sufficient to lift an object being worked on and having an air volume sufficient to support the object for transport.

* * * * *